United States Patent [19]
Hoblingre

[11] Patent Number: 5,165,720
[45] Date of Patent: Nov. 24, 1992

[54] DEVICE FOR FIXING IN POSITION AN ADJUSTABLE STEERING COLUMN OF AN AUTOMOBILE VEHICLE

[75] Inventor: André Hoblingre, Valentigney, France

[73] Assignee: ECIA, France

[21] Appl. No.: 789,678

[22] Filed: Nov. 8, 1991

[30] Foreign Application Priority Data

Nov. 9, 1990 [FR] France .................. 90 13930

[51] Int. Cl.⁵ .............................. B62D 1/18
[52] U.S. Cl. ..................... 280/775; 74/493; 411/344; 403/408.1
[58] Field of Search ............ 280/775; 74/493; 411/340, 341, 344, 348; 403/408.1, 388

[56] References Cited

U.S. PATENT DOCUMENTS 1,281,000 10/1918 Hayter .................. 411/340

FOREIGN PATENT DOCUMENTS 2430604  1/1976 Fed. Rep. of Germany ........ 74/493
2583366 12/1986 France .
1523638  9/1978 United Kingdom .

Primary Examiner—Charles A. Marmor
Assistant Examiner—Tamara L. Graysay
Attorney, Agent, or Firm—Sughrue, Mion, Zinn, Macpeak & Seas

[57] ABSTRACT

The device is of the type comprising a steering column support structure (1) connected to the rest of the structure of the vehicle and comprising two side members (2,3) between which the column is disposed, and means for fixing the column in position by urging the side walls together and comprising a rod (10) extending through and between the side members and having a first end portion (11) bearing against one of the side members and a second end portion connected to eccentric fixing means (12) provided with at least one eccentric cam (13,17) connected to an actuating lever (14) and to the second end portion (15) of the rod (10) and bearing against the other side member of the support structure for urging the side members together and thereby fixing the column in position. The at least one eccentric cam (13,17) comprises a central core (13a,17a) on which is rotatively mounted a rolling ring (13b,17b) bearing against the corresponding side member.

7 Claims, 2 Drawing Sheets

DEVICE FOR FIXING IN POSITION AN ADJUSTABLE STEERING COLUMN OF AN AUTOMOBILE VEHICLE

The present invention relates to a device for fixing in position an adjustable steering column of an automobile vehicle.

More particularly, the invention relates to such a fixing device of the type comprising a steering column support structure connected to the rest of the structure of the vehicle and comprising two side members between which the steering column is disposed, and means for fixing the column in position by urging the side members towards each other, said fixing means comprising a rod extending between the side members and having a first end portion bearing against one of the side members and a second end portion connected to eccentric fixing means comprising at least one eccentric cam connected to an actuating lever and to the second end portion of the rod and bearing against the other side member of the support structure to permit urging the side members towards each other and thereby fixing the column in position.

Such a structure is well known in the art and is disclosed for example in the document FR-A-2,360,454, more particularly with reference to FIGS. 1 and 4 of this document.

However, all the eccentric fixing means known in the art have a number of drawbacks in that they are relatively difficult to actuate.

Indeed, the eccentric cams of the eccentric fixing means bear directly against a corresponding surface of one of the side members of the support structure to permit the side members to be urged towards each other and fix the column in position. It will be understood that the greater the clamping force required, the greater is the difficulty in actuating and shifting this eccentric cam.

An object of the invention is to therefore to overcome these problems by providing a device for fixing in position an adjustable steering column of an automobile vehicle which is simple, reliable and easily actuated.

The invention therefore provides a fixing device of the type described hereinbefore, characterized in that said at least one eccentric cam comprises a central portion about which is rotatively mounted a rolling ring which bears against the corresponding side member of the support structure.

Advantageously, the fixing means comprise two cams symmetrically arranged on each side of the rod.

In one embodiment, the central portion of the or each cam comprises a projecting driving portion having a given shape for cooperation with a cavity of complementary shape in the lever so that the cam can be rotated by the lever, and the lever has two branches each provided with a cavity for a respective one of the cams.

A better understanding of the invention will be had from the following description which is given solely by way of example with reference to the accompanying drawings in which.

Figure 1:
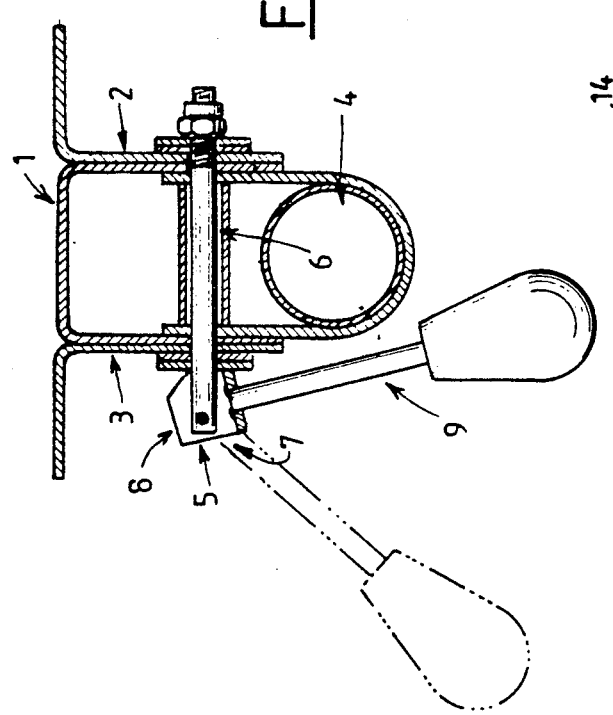
FIG. 1 is a sectional view of a device of the prior art for fixing in position an adjustable steering column of an automobile vehicle.

As can be seen in FIG. 1, a known device for fixing in position an adjustable steering column of an automobile vehicle comprises mainly a steering column support structure generally designated by the reference character 1 in FIG. 1 and connected to the rest of the structure of the vehicle and comprising two side members 2 and 3 between which the steering column 4 is disposed. This fixing device further comprises means 5 for fixing the column in position by urging the side members towards each other, these fixing means comprising a rod 6 extending between the side members and having a first end portion bearing against one of the side members and a second portion connected to eccentric fixing means 7 comprising at least one eccentric cam 8 connected to an actuating lever 9 and to the second end portion of the rod 6 and bearing against the other side member of the structure to permit urging the side members towards each other and thereby fixing the column in position.

A more detailed description of this known type of fixing device may be had from the aforementioned French document.

As mentioned before, these devices have a number of drawbacks as concerns the actuation of the eccentric cam.

Figure 3:
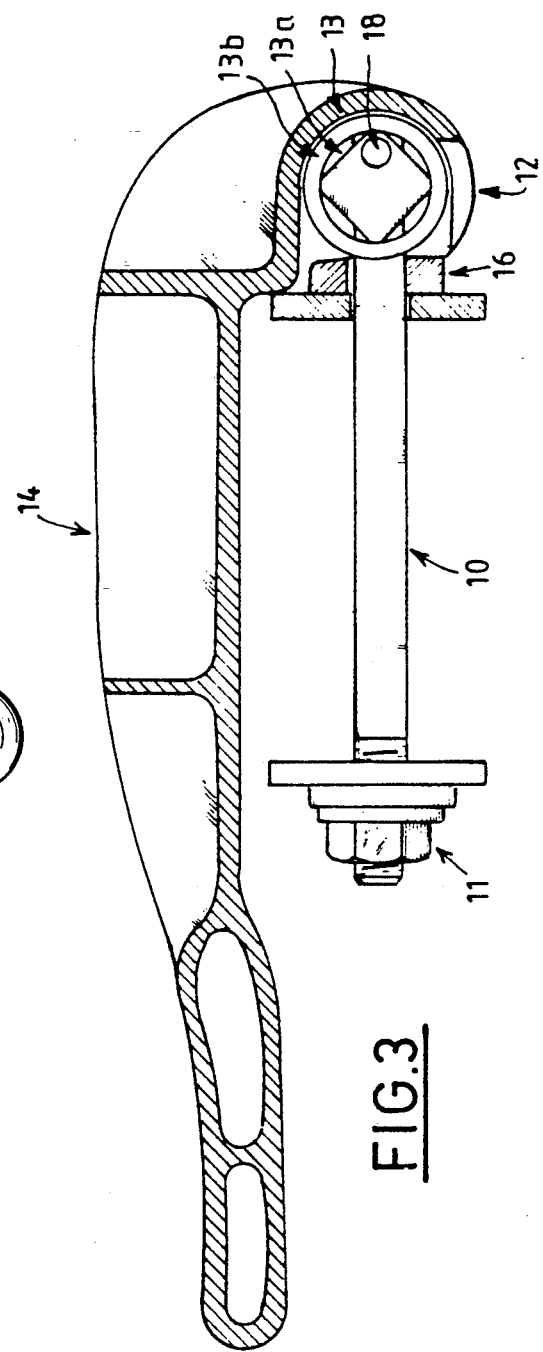
FIG. 3 is a sectional view of a part of the fixing device according to the invention, illustrating the operation of the eccentric fixing means.
Figure 2:
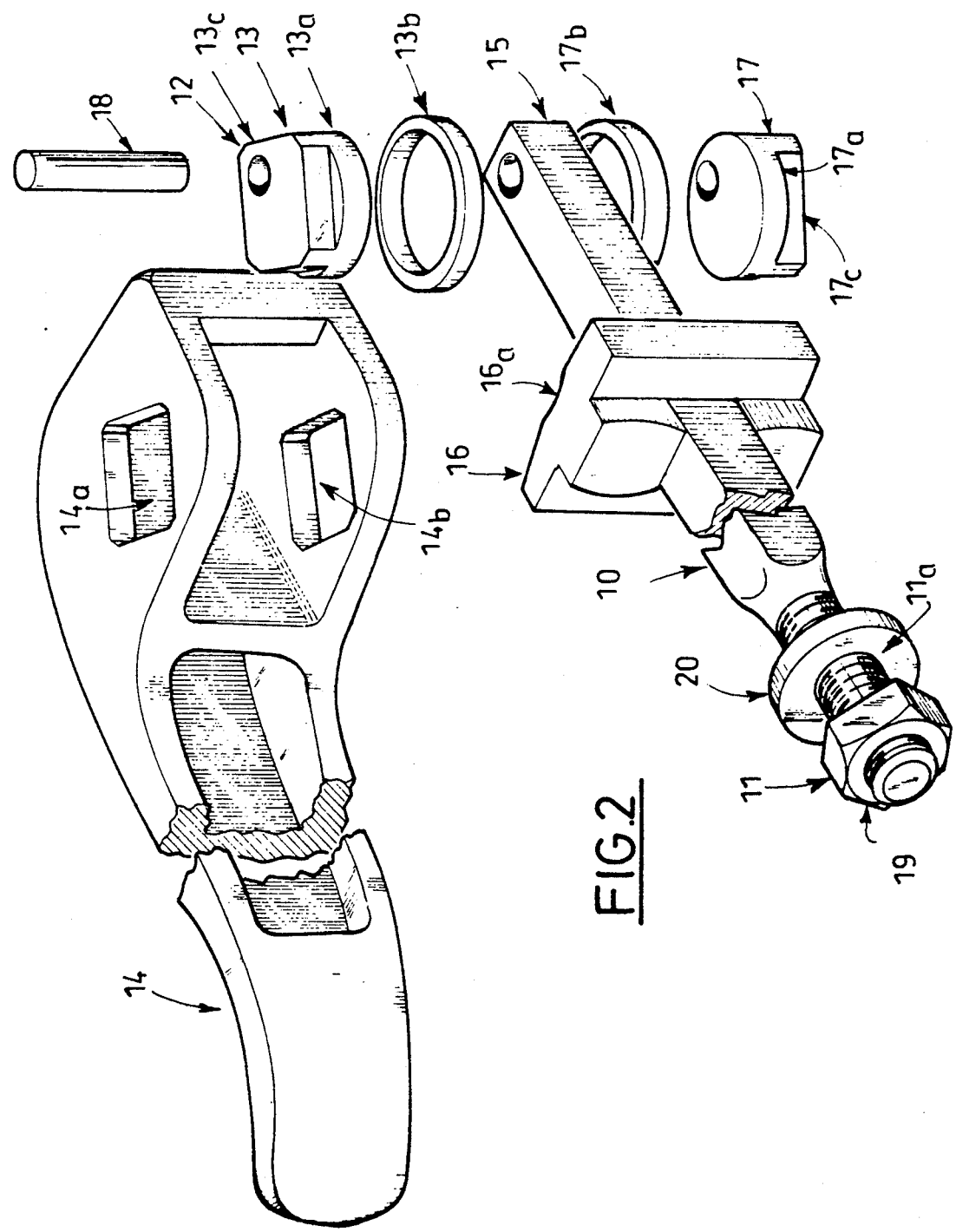
FIG. 2 is an exploded perspective view of eccentric fixing means which are a part of a fixing device according to the invention.

An object of the invention is to overcome these problems by providing a device illustrated in FIGS. 2 and 3. Note first of all that the device for fixing in position the steering column of an automobile vehicle according to the invention is a device partly similar to that described with reference to FIG. 1, in that it also comprises a column support structure connected to the rest of the structure of the vehicle and comprising two side members between which the column is disposed.

The fixing device according to the invention also comprises means for fixing the column in position by urging the side members towards each other, said fixing means comprising for example a rod 10 extending between said side members and having a first end portion 11 bearing against one of the side members, or a first side member, and a second end portion connected to eccentric fixing means 12 comprising at least one eccentric cam 13 connected to an actuating lever 14 and to the second end portion 15 of the rod and bearing against the other side member of the support structure, or second side member, to permit urging the side members towards each other and thereby fixing the column in position. As illustrated, an intermediate bearing member 16 may be interposed between the eccentric cam of the fixing means and said other side member of the support structure.

In the embodiment of the invention illustrated in FIGS. 2 and 3, the fixing means comprise two eccentric cams 13 and 17 symmetrically arranged on each side of the rod and more particularly of the second end portion 15 of the latter. These eccentric cams comprise a central portion respectively 13a and 17a on which is rotatively mounted a rolling ring respectively 13b and 17b adapted to bear against the corresponding side member of the support structure, for example through the intermediate bearing member 16.

It will be understood that the displacement of the cams with respect to the rest of the structure of the fixing means and in particular said side members, is easier than in the devices of the prior art in that this rolling ring facilitates the relative displacement in translation and in rotation of the various component parts of the fixing means.

The cams 13 and 17 as well as the end portion 15 of the rod each include an aperture for the passage of a connecting pin 18 which extends through the central portions of the cams and the respective end portion of the rod so as to interconnect these component parts.

Although in the embodiment shown in FIGS. 2 and 3 the fixing means which are part of the fixing device according to the invention comprise two cams arranged on each side of the respective end portion of the rod, it will be understood that these fixing means may comprise only a single cam.

The central portion of the or each cam comprises a driving projecting portion respectively 13c and 17c having a given shape for cooperation with a cavity of complementary shape 14a, 14b in the lever 14 so that the lever can drive the cams. The lever comprises two branches extending on each side of the respective end portion of the rod and each provided with said cavity for driving the respective cam and thereby enabling the user to shift, by actuating the lever 14, the cams to an active position in which they urge said side members of the support structure towards each other and thereby fix the steering column in position.

The intermediate bearing member 16 interposed between the or each cam and the respective side member of the support structure comprises a recess 16a for receiving the or each cam and defining a stable column fixing position. Indeed, when the lever 14 is shifted to bring it to the position for fixing the steering column in position, the cams, and more particularly the rolling rings 13b and 17b of the cams, bear against and move relative to the intermediate bearing member 16 and urge said side members towards each other. When these rolling rings enter the recess 16a in the intermediate bearing member, the user feels a discontinuity in the effort required indicating that the lever and the fixing means are in a stable column fixing position.

Note that the first end portion 11 of the rod 10 is a screwthreaded portion 11a on which is screwthreadedly engaged a nut 19 associated for example with a washer 20 for bearing against the respective side member of the support structure in a way similar to that shown in FIG. 1, this nut enabling the effort exerted on the side members for fixing the steering column in position to be adjusted.

What is claimed is:

1. Device for fixing in position an adjustable steering column of an automobile vehicle, relative to a steering column support structure which is connected to a structure of said vehicle and comprises two side members between which side members the column is disposed, said device comprising means for fixing the column in position by urging the side members towards each other, said means comprising a rod for extending between said side members and having a first end portion for bearing against a first side member of said side members and a second end portion, eccentric fixing means connected to said second end portion of said rod and comprising at least one eccentric cam, an actuating lever, said at least one eccentric cam being connected to said actuating lever and to said second end portion of said rod, said at least one cam being provided for bearing against a second side member of said side members of said support structure for urging said side members towards each other and thereby fixing the column in position, said at least one cam comprising a central portion and a rolling ring being rotatively mounted on said central portion for bearing against said second side member.

2. Device according to claim 1, wherein said central portion of said at least one cam comprises a driving projecting portion having a given shape, a cavity having a shape complementary to said given shape being provided in said lever and cooperative with said projecting portion so that said lever is capable of driving said at least one cam.

3. Device according to claim 1, wherein said at least one cam is connected to said second end portion of the rod by a connecting pin.

4. Device according to claim 1, wherein said fixing means comprise two of said at least one cam symmetrically arranged on opposite sides of said rod.

5. Device according to claim 4, wherein said lever comprises two branches diposed on opposite sides of said rod, said central portion of each of said cams comprising a driving projecting portion having a given shape, a cavity being provided in each of said branches and having a shape complementary to said given shape of the projecting portion of a respective one of said two cams and cooperative with said projecting portion so that said lever is capable of driving said cams.

6. Device according to claim 1, further comprising an intermediate bearing member interposed between said at least one cam and said second side member of said support structure and defining a recess for receiving said at least one cam and defining a stable column fixing position.

7. Device according to claim 1, wherein said second end portion of said rod is a screwthreaded portion on which is screwthreadedly engaged a nut for bearing against said first side member.

* * * * *